(12) United States Patent
Wang

(10) Patent No.: US 11,392,584 B2
(45) Date of Patent: Jul. 19, 2022

(54) COUF, A DATA ANALYSIS METHOD

(71) Applicant: Zhiping Wang, McLean, VA (US)

(72) Inventor: Zhiping Wang, McLean, VA (US)

( * ) Notice: Subject to any disclaimer, the term of this patent is extended or adjusted under 35 U.S.C. 154(b) by 0 days.

(21) Appl. No.: 16/920,676

(22) Filed: Jul. 4, 2020

(65) Prior Publication Data

US 2020/0334255 A1    Oct. 22, 2020

Related U.S. Application Data

(63) Continuation-in-part of application No. 15/404,141, filed on Jan. 11, 2017, now abandoned, which is a continuation of application No. 15/361,441, filed on Nov. 27, 2016, now abandoned.

(51) Int. Cl.
| | |
|---|---|
| *G06F 16/2453* | (2019.01) |
| *G06F 16/2455* | (2019.01) |
| *G06F 16/2457* | (2019.01) |
| *G06F 16/248* | (2019.01) |
| *G06F 16/22* | (2019.01) |

(52) U.S. Cl.
CPC .... *G06F 16/24539* (2019.01); *G06F 16/2282* (2019.01); *G06F 16/248* (2019.01); *G06F 16/24552* (2019.01); *G06F 16/24573* (2019.01)

(58) Field of Classification Search
CPC ... G06F 16/217; G06F 16/254; G06F 16/2465
See application file for complete search history.

(56) References Cited

U.S. PATENT DOCUMENTS

| | | | |
|---|---|---|---|
| 6,665,661 B1 | 12/2003 | Crow et al. | |
| 9,069,726 B2* | 6/2015 | Lu | G06F 17/18 |
| 9,372,889 B1* | 6/2016 | Jakobsson | G06F 16/24542 |
| 2003/0004973 A1 | 1/2003 | Harper et al. | |
| 2004/0073534 A1* | 4/2004 | Robson | G16B 50/00 |
| 2011/0258225 A1* | 10/2011 | Taylor | G06F 16/2272 |
| | | | 707/769 |
| 2012/0323871 A1* | 12/2012 | Zaifman | G06F 16/174 |
| | | | 707/699 |

OTHER PUBLICATIONS

Paul Dawkins, "Paul's Online Notes" pp. 1-10 (Year: 2009).*
Shoens et al., "Synthetic workload performance analysis of incremental updates" pp. 329-338 (Year: 1994).*
Web page Apache Hadoop, by Wikipedia.
Web page Apache Spark, by Wikipedia.
Web page Spark vs. Hadoop MapReduce, by Donal Tobin.
Calculus II—Power Series, Paul's Online Math Notes (© 2003-2020 Paul Dawkins).

* cited by examiner

*Primary Examiner* — Mark D Featherstone
*Assistant Examiner* — Kweku William Halm
(74) *Attorney, Agent, or Firm* — Stonebridge IP, PLLC

(57) ABSTRACT

A calculate once use forever (COUF) method to efficiently determine statistics on data records of a data set. Data records are read from an original data set and grouped together into units and simple statistic on each unit are calculated and stored in a database. When a query asking for an additional statistic comes in, the additional statistic can be determined quickly and efficiently from the already calculated unit simple statistics so that read redundancies and computational redundancies can be eliminated.

17 Claims, 6 Drawing Sheets

COUF, A DATA ANALYSIS METHOD

CROSS REFERENCE TO RELATED APPLICATIONS

This application is a continuation in part of U.S. application Ser. No. 15/404,141, filed on Jan. 11, 2017 which is a continuation of U.S. application Ser. No. 15/361,441, filed on Nov. 27, 2016. The benefit under 35 USC § 120 for both earlier non-provisional applications is hereby claimed, and the aforementioned applications are hereby both herein incorporated by reference in their entireties.

FIELD OF THE INVENTION

This invention relates generally to the field of data analysis, data mining and more specifically to big-data analysis.

BACKGROUND OF THE INVENTION

Nowadays more and more businesses, governmental agencies and other organizations need to deal with huge amount of data every day. With the spread of Internet and widely adopted e-commerce, the data sizes grow exponentially and they easily exceed terabytes, petabytes or even beyond. In order to find consumer trends, uncover fraud, or detect terrorists, or for other purposes, analyses on big data have become critical to achieve these tasks. However, the huge amount of data makes the analyses difficult, if not impossible.

To solve this problem, Hadoop was created by Doug Cutting and Mike Cafarella in 2005. Since then many companies have contributed to Hadoop project, including Google, Yahoo, Facebook, LinkedIn, eBay, IBM and others. Hadoop has become an open-source software framework for distributed storage and distributed processing of very large data sets on computer clusters built from commodity hardware.

The core of Apache Hadoop consists of a storage part, known as Hadoop Distributed File System (HDFS), and a processing part called MapReduce. Hadoop splits files into large blocks and distributes them across nodes in a cluster. To process data, Hadoop transfers packaged code for nodes to process in parallel based on the data that needs to be processed. Compared to a single computer, Hadoop greatly speeds up the process time and makes the big-data analysis possible. Since the introduction of Hadoop, many companies have adopted it and this number is growing every day.

However, there are two obvious disadvantages associated with Hadoop. First, it is its storage requirement; it stores the same data across multiple data nodes in a cluster, sometimes thousands of nodes. Second, each record may get read multiple times, hence some of the same computations may get performed over and over again. This is redundant and a waste of time and it makes the whole process slow. People have realized this problem with Hadoop, and as a result, Spark was introduced at UC Berkeley's AMPLab in 2009.

In 2013, Spark project was donated to the Apache Software Foundation. In February 2014, Spark became a Top-Level Apache Project. Apache Spark processes data in-memory while Hadoop MapReduce persists back to the disk after a map or reduce action, hence Spark should perform better than Hadoop MapReduce. But there is a setback. In order for Spark to work well, entire data set needs to be fitted into the memory, Spark needs a lot of memory and memory is more expensive. When the data set cannot be fitted into the memory, Spark does not work well. Furthermore, when the same query is executed continually, it runs very fast. This is because the results are the same and stored in the memory, once the data is read and calculated, no more reading and computing are needed. However, when a different query is submitted, new read and new computation will be needed even though the queried data in the new query might be a subset of data for a previous query. Hence data read and computation redundancies still remain. This leaves some room for improvement and that is why COUF is invented.

SUMMARY OF THE INVENTION

It is therefore an object of the present invention to provide an improved method and apparatus to efficiently calculate statistics that reduces processing time and resources.

It is also an object of the invention is to provide a new and simple big-data analysis method and apparatus.

It is yet object of the invention is to provide a new and easy data analysis method for data mining.

It is yet another object of the invention is to provide a new and simple process for risk analysis.

Yet another object of the invention is to provide a new, easy, simple and efficient method and apparatus for data analysis, especially for big-data analysis.

Other objects and advantages of the present invention will become apparent from the following descriptions, taken in connection with the accompanying drawings, wherein, by way of illustration and example, embodiments of the present invention are disclosed.

In accordance with the embodiments of the invention, there is a computer system with a database. Original data set are divided into plurality of units; simple statistics on each unit are calculated and stored into the database. These unit simple statistics can easily be used to calculate subsequent query statistics on the records in any arbitrary combination of units.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
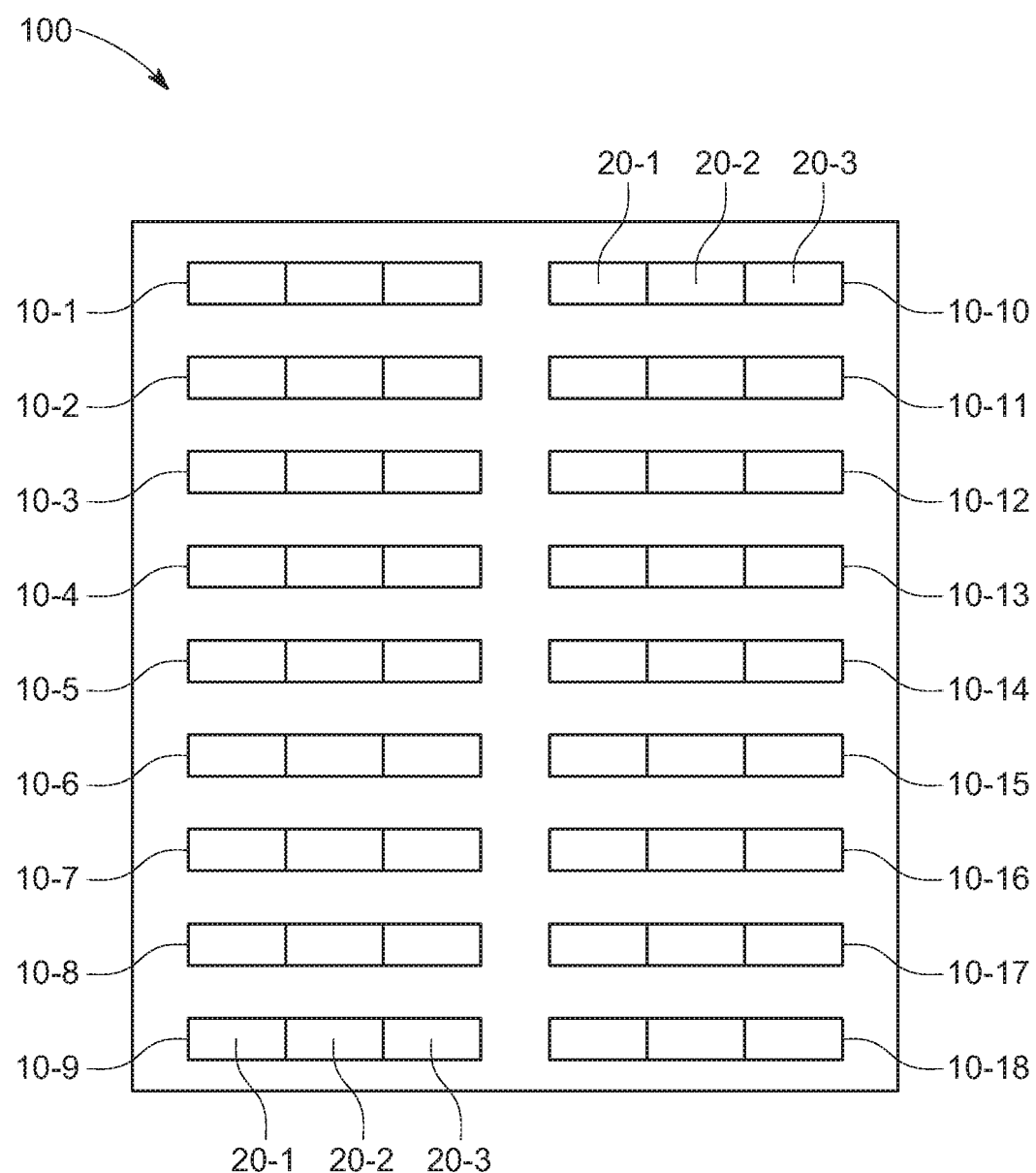
FIG. 1 is a view of a dataset showing raw data according to the principles of the present invention.

In most cases of trend findings, fraud detections, risk analyses and other cases of data mining and analyses, records as a group are queried, not as individual record. Based on this fact, this invention works as follows:

Turning now to FIG. 1, a data set 100 may be received that includes raw data in the form of a plurality of records 10-1 to 10-18. Although data set 100 includes 18 data records, the present invention is in no way so limited as a data set can include millions or even trillions of data records and still be within the scope of the present invention. Each record may include one or more fields 20-1, 20-2, 20-3 etc., and the fields may be numeric, textual, a combination thereof or of other form. It is possible to arrange these records into units where each unit includes one or a plurality of data records and each data record belongs to one, zero or a plurality of units. As will be described later, one or a plurality of data sets can be received and processed from a data feed.

Figure 2:
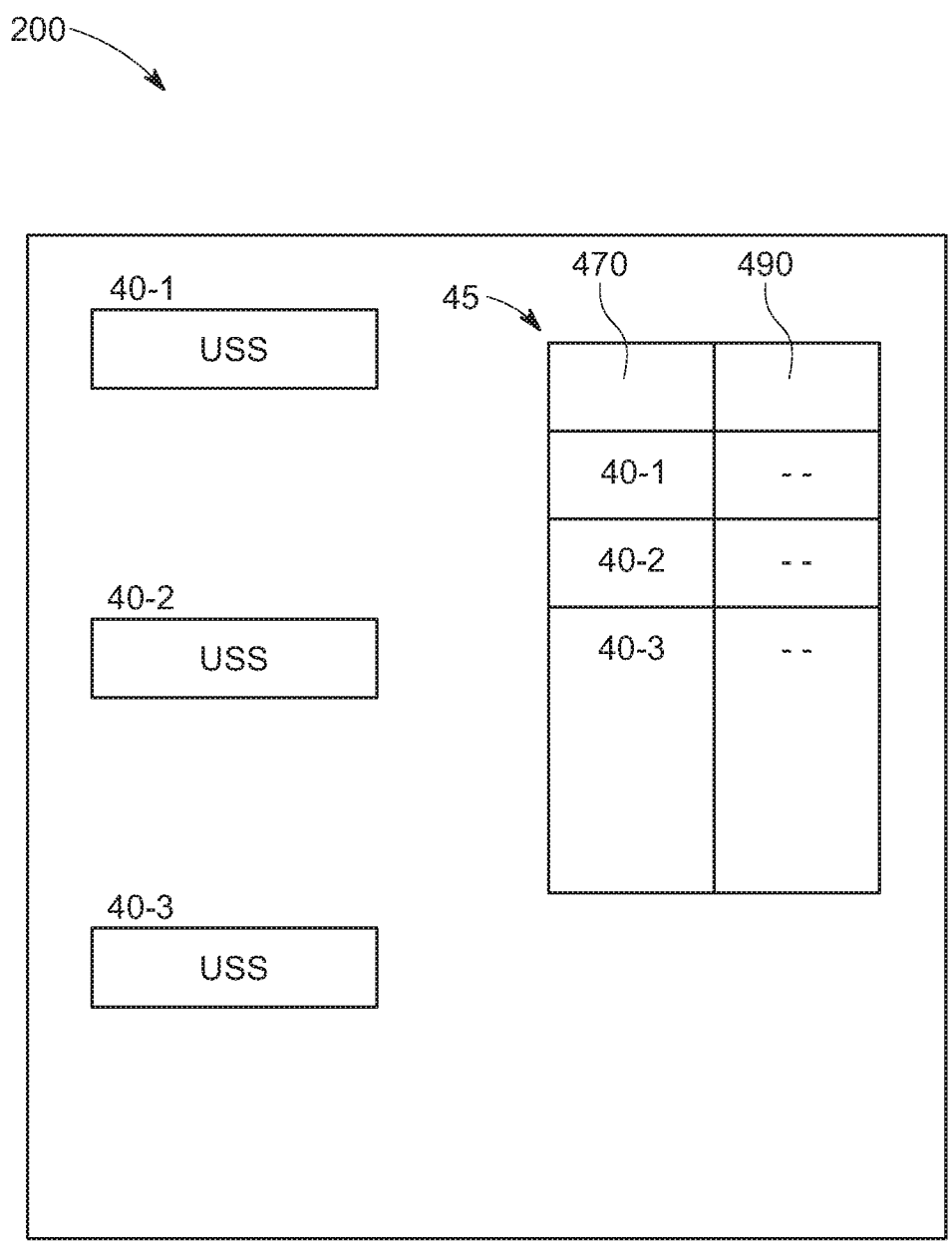
FIG. 2 is a view of a database including a plurality of units having unit simple statistics according to the principles of the present invention.

Turning now to FIG. 2, FIG. 2 illustrates one representation of a database 200 constructed according to the principles of the present invention. As illustrated in FIG. 2, database includes a COUF table of unit simple statistics 40-1, 40-2, 40-3 etc. and a database table of attributes 45. Each of 40-1, 40-2, 40-3 represents one unit, each unit corresponding to one or a plurality of data records 10. In each unit in database 200, unit simple statistics is stored based on the fields of the data records that correspond to that unit. For example, unit 1 may have a primary key or unique identifier of 40-1, may be derived from data records 10-5, 10-6, 10-7, 10-17 and 10-18 of FIG. 1, and may pertain to test scores of female students in subject 1 which may be Social Studies given on Mar. 2, 2020. Unit 40-2 may pertain to data records 10-13 and 10-14 and may pertain to test scores for male students in subject 2 which could be a math class on Apr. 10, 2020. Unit 40-3 may pertain to test scores of female students in Social Studies for Dec. 19, 2019 and pertain to records 10-1, 10-2, 10-3, 10-4, 10-8, 10-9, 10-10, 10-11, 10-12, 10-15 and 10-16. The definitions or attributes of each unit can vary according to any business needs and the above is merely exemplary and is in no way limiting the present invention. Also included in database 200 is the database attribute table 45 that includes a primary key 470 identifying each unit 40-1, 40-2 and 40-3 stored within each unit, and the attributes 490 of that unit that explains such a grouping along with unit simple statistics.

It is noted that the data records themselves are not stored in database 200. Instead they remain in data set 100 which may be stored in archival storage so that central controller resources can be preserved. As a result, the size of database 200 can be much smaller than dataset 100, thereby conserving memory resources.

As described previously, units of the present invention can represent many different possible meanings. For example, a unit might represent female Hispanic students who took a certain examination at a certain time at a certain school and thus each record in that unit includes at least one numerical field and at least one textual field as the exam score is numerical and the student name is textual. Another example is a unit may represent consumers in a certain locale who bought a certain product at a certain time, which could lend itself to a combination of both numerical and textual data fields. Another example of a unit is Internet traffic on a certain route at a certain time period which would lend itself to numerical data fields, and yet another example is a certain stock purchased at a certain time period at certain place which would also lend itself to a numerical data field, etc.

Figure 3:
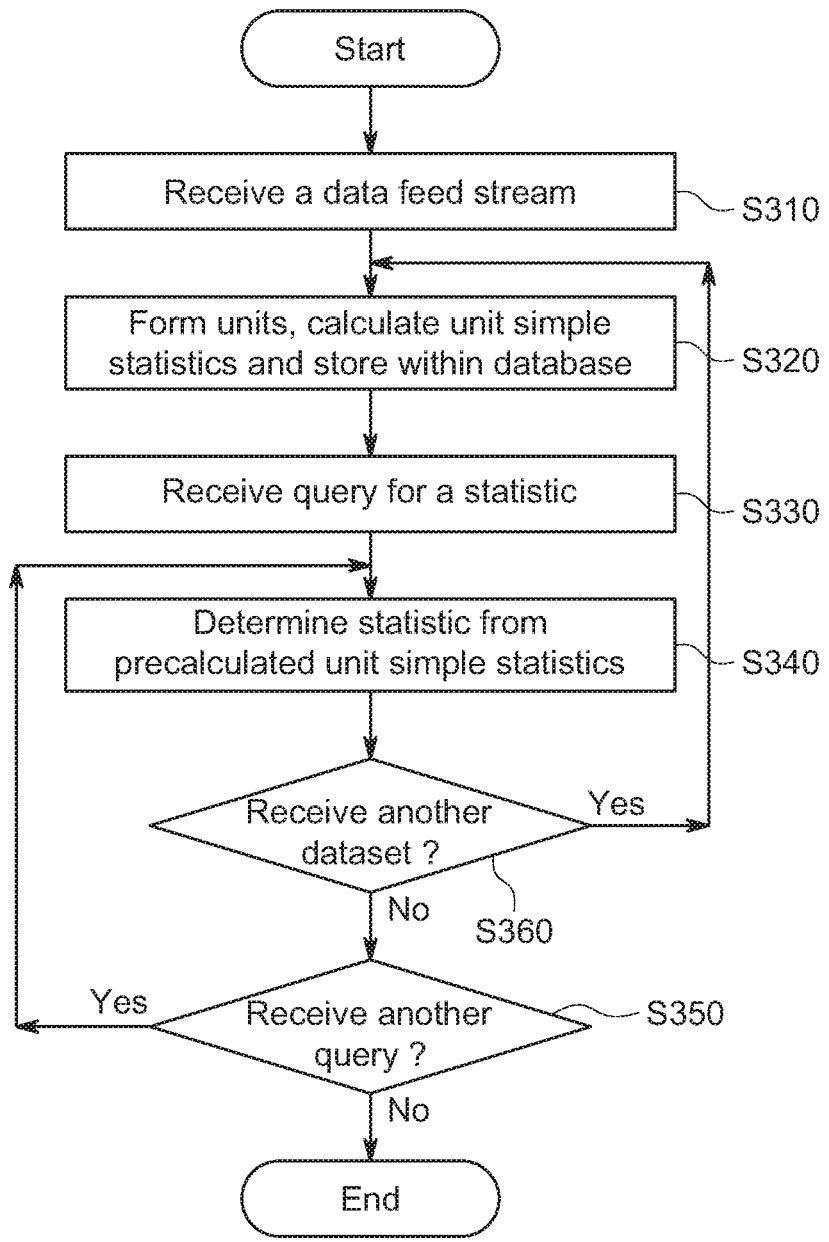
FIG. 3 is a flowchart illustrating a COUF method of determining statistics according to the principles of the present invention.
Figure 4:
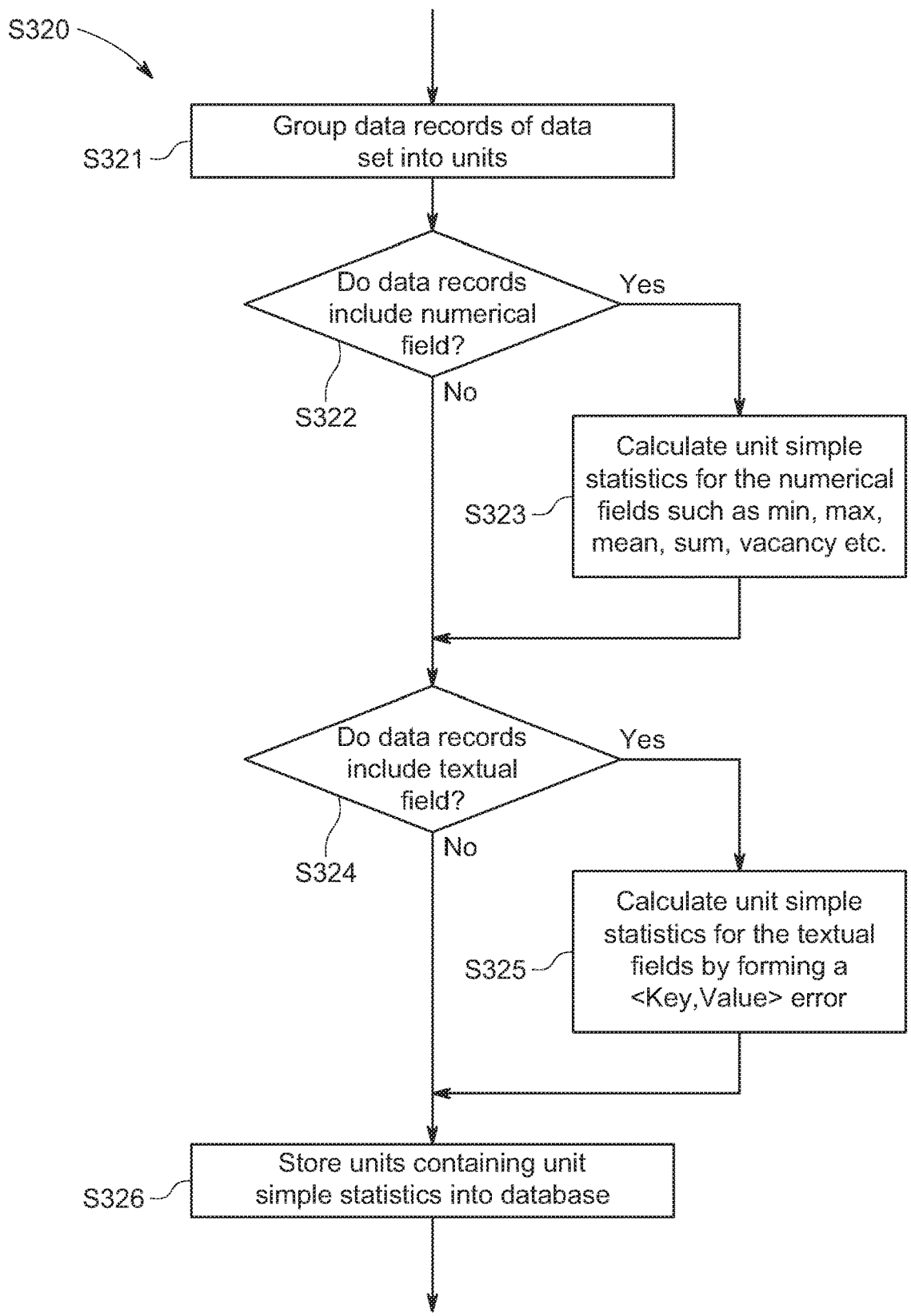
FIG. 4 is a flowchart illustrating the step of constructing the database of FIG. 3.

Turning now to FIGS. 3 and 4, FIGS. 3 and 4 illustrate a flowchart showing a COUF method according to the principles of the present invention. A data feed that includes at least one dataset is first received at S310. After receiving the data set 100, data records of the data set of the data feed are grouped into units, unit simple statistics calculated for each unit are stored within database 200 at S320.

As illustrated in FIG. 4, this S320 includes first grouping the data records 10 (i.e. 10-1, 10-2, etc.) of dataset 100 into units 40 (i.e. 40-1, 40-2, etc.) in S321. Then, it is determined in step S322 whether the data records contain a numerical field. If the data records contain a numerical field, unit simple statistics for the numerical field of each unit are determined in S323, and these statistics can include minimum of the record values, maximum of the record values, number of records, mean of the record values, variance of the record values, sum of the record values, sum of the squares of the record values, etc. Then in step S324, it is determined whether the data records include a textual field. If there is a textual field, unit simple statistics for the textual field are calculated in the form of a <Key, Value> array in S325. Key may refer to a word or words found in a data record, and Value may be an attribute of the Key word or words, such as count or frequency of occurrence etc. within the unit. Then, the unit simple statistics are stored in a database 200 in S326. If this is the first dataset received, these units and their statistics are calculated from scratch. If this is a second or subsequent dataset received, then the units and unit simple statistics are updated to reflect the newly received dataset.

Subsequent to forming database 200, when a query comes in at S330 asking for some statistic to be calculated perhaps because some sort of report needs to be generated based on some business needs, the statistic may be calculated from the previously calculated unit simple statistics in S340 as opposed to calculating the statistic from scratch by rereading the data records. Steps S350 and S360 pertain to receiving subsequent queries and subsequent datasets from a data feed or stream. As a result, processor and central controller resources are conserved and processing time is shortened by eliminating rereading and recalculating redundancies. These savings can add up when large amounts of data are involved.

As indicated above, whether the field of each data record in a data set is numerical or textual will determine what kind of unit simple statistics will be calculated. The following are examples of how data sets containing records having numerical data fields are treated differently from that of data sets having records containing textual data fields.

Regardless of whether the records contain numerical fields, textual fields or a combination thereof, the unit simple statistics for the units usually include the number of records in said unit, which is represented by n. This is an addable statistic. Therefore, if two units are later combined into one big unit or group, then the number of records of the new and big unit can be determined by simply adding together the record number unit simple statistic of the two smaller units so that recounting all the data records all over again can therefore be avoided, thereby shortening processing time and reducing processor resources consumed. Similarly, the sum of the values and the sum of the square of the values of the new bigger unit can be found by merely adding together these quantities of the smaller constituent units. Furthermore, the minimum and maximum values of the new bigger unit can be quickly determined by determining the minimum and maximum of the minimum and maximum values of the constituent smaller units, so that recalculation of these quantities of the newer bigger unit from scratch by rereading all the data records can be avoided, saving processor and controller resources and shortening processing time.

When the data records contain a textual field, the unit simple statistics include a <Key, Value> array which is a plurality of <Key, Value> ordered pairs. This <Key, Value> array may be calculated and stored into the database as the pre-calculated unit simple statistics for each unit. Here, "Key" is usually textual and often represents portions of text from the fields of the data records, but could also include other forms such as video, voice, image, etc. and still be within the scope of the present invention. When "Key" is textual, Key is generally key textual words in the non-numerical field and Value is a number, such as the count or number of occurrences associated with the Key in the non-numerical field. As a result, when a query subsequently combines one or plurality of units together, new Values can be easily obtained by simply adding the addend Values of each <Key, Value> ordered pair together according to the corresponding Keys for the involved units. Other statistics can be calculated based on the newly-calculated <Key, Value> array and these statistics are actual statistics on those data records that include these units in the queried group.

When the data set includes units that include data records that includes a numerical field, say x, in each unit, unit simple statistics for each unit may include the minimum value of the numerical field for each unit, $\min(x)$, the maximum value of the numerical field, $\max(x)$, and other addable statistics such as the number of records in the unit, the sum of the numerical field, $\Sigma x$ and the sum of the numerical field squared, $\Sigma x^2$ are calculated for each unit and stored within database 200. When a query subsequently combines one or plurality of units into a larger unit or group, new unit simple statistics for the group can easily be calculated from the unit simple statistics of the constituent addend units, often by just adding the addends together. For this group in the query, based on the unit simple statistics previously calculated and stored in the database, it is very easy to calculate other statistics for this numerical field, such as the number of records, sample mean, sample variance, variance, standard deviation, sample standard deviation, range, etc. These are actual statistics on those data records within these units in the queried group.

For a numerical field in data records of a unit, there are other ways to calculate and store unit simple statistics. One of them could be the number of records, the sum of the numerical field and the variance on this numerical field among records in this unit, or the mean and the variance (or variance in different forms including variance, sample variance, standard deviation, sample standard deviation, etc.) on this field among data records in this unit. When a query combines one or plurality of units, because many of these statistics are not addable, the new sample mean, sample variance, variance, sample standard deviation and standard deviation can be calculated through mathematical formulas to be discussed, even though it would be a little more complicated than merely adding together two numbers. Again, these are also actual statistics on those data records arranged within these units in the queried group. Because new unit simple statistics for the newly formed group can be determined by merely adding together or using formulas as opposed to rereading all the data records of the group and calculating the statistic from scratch, processing time is reduced and processor resources are conserved.

As mentioned above, each data record needs only be read once when producing database 200 and each unit includes one or plurality of original data records. In some cases, a unit could comprise thousands, millions or even trillions of original data records. This could result in a dramatic reduction of storage requirement. Furthermore, the unit simple statistics on each unit is calculated only once, there is no redundancy for reads and calculations, and hence this solves the problems both Hadoop and Shark have.

When a query is performed on the database, the unit simple statistics stored within database 200 is much smaller than the original data set, and new statistics are easy to calculate based on the pre-calculated unit simple statistics on the involved units. As a result, the query can be processed much faster, thereby improving efficiency, reducing time and conserving resources. Since each record is read only once and unit simple statistics calculated once, the database, hence COUF, is easy to build. In many cases, most of the tasks include ETL or Extract-Transform-Load processes. Once this database 200 is built, determining query statistics become much easier to calculate, and various analyses can be done much faster, including data mining, trend findings, predictions, fraud detections, risk analyses, various statistical tests and analyses, just to name a few. This results in COUF being easy to use. Because the unit simple statistics are either addable or easy to re-calculate by taking a new minimum or a new maximum, when new records are added into a unit, the new unit simple statistics are very easy to re-calculate. As a result, processing resources can be conserved, and the time used to calculate statistics of queries can be shortened. Therefore, COUF can greatly improve efficiency, especially when large amounts of data are involved.

The core of this method is that each data record is read once and unit simple statistics are calculated once so that both reading and calculation redundancies are eliminated. Queries use these unit simple statistics whenever they need to, that is why this method is called COUF, or "Calculate Once, Use Forever". COUF is simple, efficient, fast, easy to build, easy to use and easy to maintain.

COUF is a new big-data analysis process. Even through the mathematical formulas used by COUF are well-known, the way how to use them has never been done before. This is a brand-new process.

Currently all big-data analysis methods, such as Amazon Web Services (AWS), Microsoft Azure, Hadoop and Sharp, etc. all have a common drawback, that being redundancy. The same read and the same computation could be performed repeatedly, this is called read redundancy and computing redundancy respectively. COUF avoids both redundancies. As a result, COUF is more efficient and more effective compared to other big-data analysis methods. With COUF, consumer trends and patterns can be discovered efficiently. COUF can be used in wide range of areas, from education to finance, from marketing to government agencies, from cyber security to pharmaceutical industries, just name a few. With COUF, it is also easy to find out the areas of unusual activity or fraud. This is useful for cyber security, even for national security.

When we conduct big-data analyses, it usually involves thousands or billions or trillions of data records. In the present invention, when such a data set is received, multiple units are defined and unit simple statistics are generated for those multiple units. With COUF, you do not need to read data records in each involved unit in order to compute the statistics. All you need to do is combine the unit simple statistics for those involved units together with some simple computation, hence reading and computing redundancies are avoided and processor resources are saved and time to make such calculations is reduced. This is analogous to referring to an index of a book to find something as opposed to rereading the entire book to do so. Thus, the unit simple statistics have similarities to that of an index of a book. However, unlike an index of a book, using COUF is actually superior to an index of a book as it is not necessary to flip through any pages. COUF avoids rereading and re-computing each time a request for a statistic is made. This is how COUF is beneficial and it has never been done before.

Here a unit may include up to thousands or even millions of data records. To read though those records and calculate statistics for those records over and over again is very costly, time consuming and hogs resources. Even when your queries are just slightly different from before, those same reads and same computations are needed. This is very costly, inefficient, time-consuming and drains resources. COUF reads those records and calculates unit simple statistics once when the data is loaded into said database. As a result, you may not need to read and calculate those records again. That is why this process is called Calculate Once, Use Forever, or COUF.

When the data records of a data set include non-numerical fields such as textual fields, unit simple statistics for each unit are calculated by forming <Key, Value> arrays, or an array of ordered pairs where Key often denotes text found within the data set and value is associated with the Key and often denotes a number describing an attribute of said key, such as a count or frequency. The unit simple statistics for textual fields of data records are very useful in text analyses, such as web posting analyses, blog analyses, cyber security analyses, newspaper articles, etc.

By pre-calculating the array of <Key, Value> ordered pairs for each unit prior to when queries requesting statistics on the dataset 100 come in, when we later need to find the <Key, Value> for any combination of said units, we merely just combine the said Values for the same Key in said combination. Hence the new <Key, Value> for this combination of said units are very easy and quick to determine, and the need to read each of the units and then make the computations from scratch for those units in the combination is avoided.

When the fields of the data records of a data set are numerical and not textual, pre-calculation of the unit simple statistics for each unit is treated differently than when the fields are textual. For numeral fields, the unit simple statistics may instead include the number of records, the minimum value, the maximum value, the sum of said numerical values and the sum of said numerical values squared, etc. These attributes for each unit are pre-calculated and stored into said database when the database is formed, and are used later when queries are made or when units are combined.

In big-data analyses when units are combined for analyses, we simply combine the pre-calculated unit simple statistics already stored in said database for those units in the combination. Again, it is no longer necessary to read each data record again and calculate the statistics from scratch, and therefore read redundancies and computer redundancies can be eliminated. Once the unit simple statistics are obtained, they can be used in various statistical tests and analyses, as well as other analyses, such as prediction analyses, time series analyses, and other applications obvious for anyone who is familiar with statistics. As a result, computer resources are conserved, processing time is shortened, and a more efficient process and apparatus for calculating statistics on a database can be realized.

Figure 5:
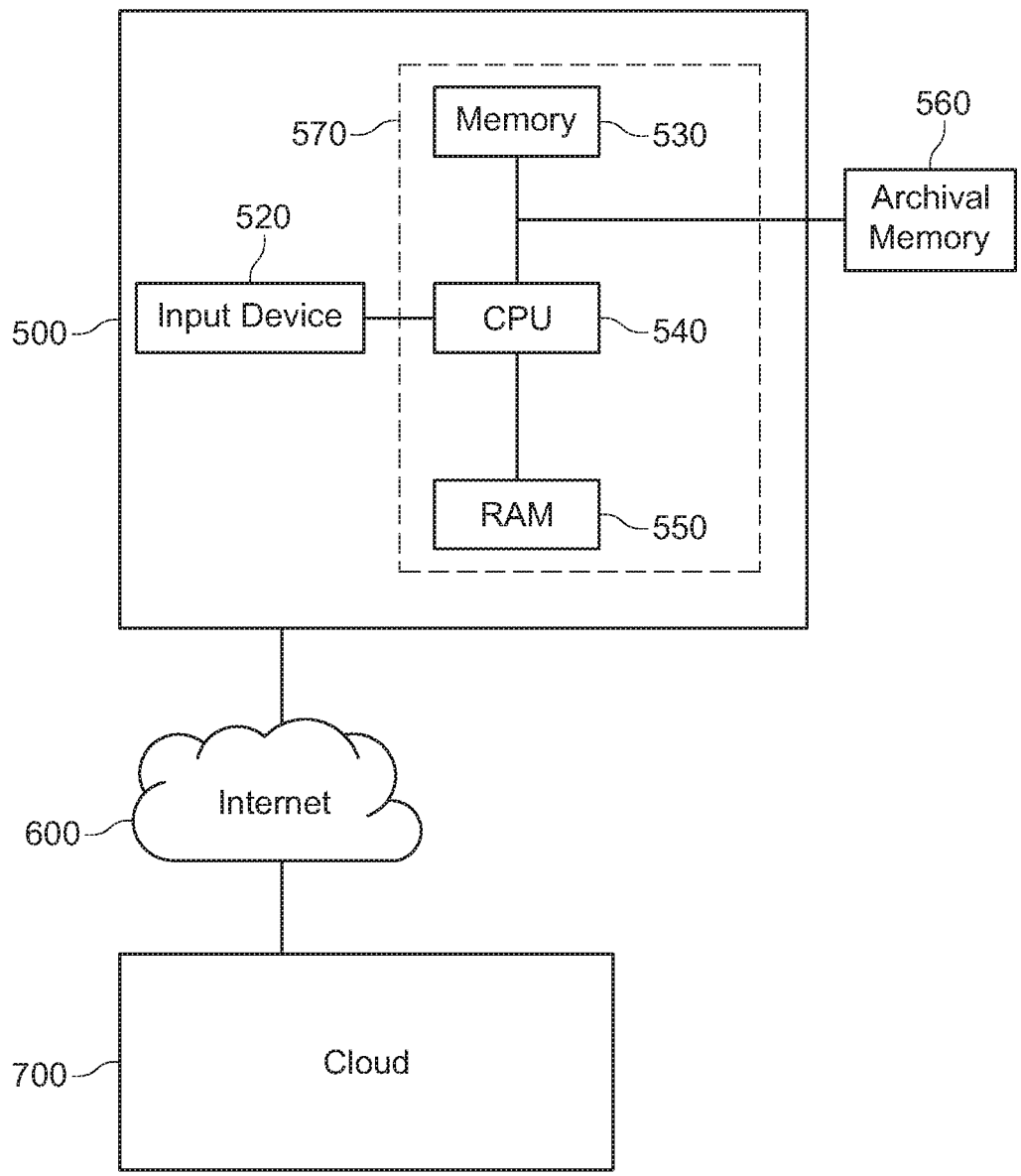
FIG. 5 is a view of the apparatus of efficiently determining statistics according to the principles of the present invention.

Turning now to FIG. 5, FIG. 5 illustrates an apparatus of the present invention. As illustrated in FIG. 5, the above methods may occur within computer 500. A dataset 100 can be received from cloud 700, Internet 600, or a thumb drive or other medium that can attach to computer 500. The RAM 550 can calculate the unit simple statistics, and can do the statistical calculations. A data feed containing the datasets of raw data can be received from the Internet 600, input device 520, cloud 700 or the like. Likewise, a query may be received from Internet 600 or input device 520 or some form of attachable memory.

Computer 500 may include one or a plurality of CPU's 540, RAM 550, memory 530 and archival memory 560. A central controller 570 may be a combination of RAM 550, CPU 540 and memory 530. Memory 530 can be a hard disk drive or a solid-state drive. Archival memory 560 can be an external tape or other storage device that can be detachable from computer 500 that consumes minimal CPU and central controller resources. After a data feed has been received and processed to form a database 200, the original data set 100 may be stored in archival memory 560 as it may rarely need to be accessed, thereby conserving memory 530 and 550 and central controller 570 resources. Database may be stored in RAM 550 or memory 530 where it is easily accessed.

The present invention can be performed on a computer 500 like a PC or a computer server or mainframe, or can be calculated using cloud computing in cloud 700. When done on a computer, the invention can be embodied as a non-transitory computer program product including a non-transitory computer readable storage medium 530, 550 having program instructions embodied therewith to process a dataset having a plurality of data records, the program instructions executable by a processor 540 to cause the processor to perform the steps in FIGS. 3-4. The invention can also be a computer implemented method in a data processing system including processor 540 and a memory 530 and 550 including instructions which are executed by the processor to cause the processor to calculate query-initiated statistics on data records within a dataset. In either case, the calculation of queried statistics from pre-calculated unit simple statistics reducing processor time and processor resources by avoiding having to reread the data records and recalculate all the statistics from scratch. Alternatively, the method of FIGS. 3-4 can occur in cloud 700 via cloud computing and conserve processor resources and reduce processing time.

Figure 6:
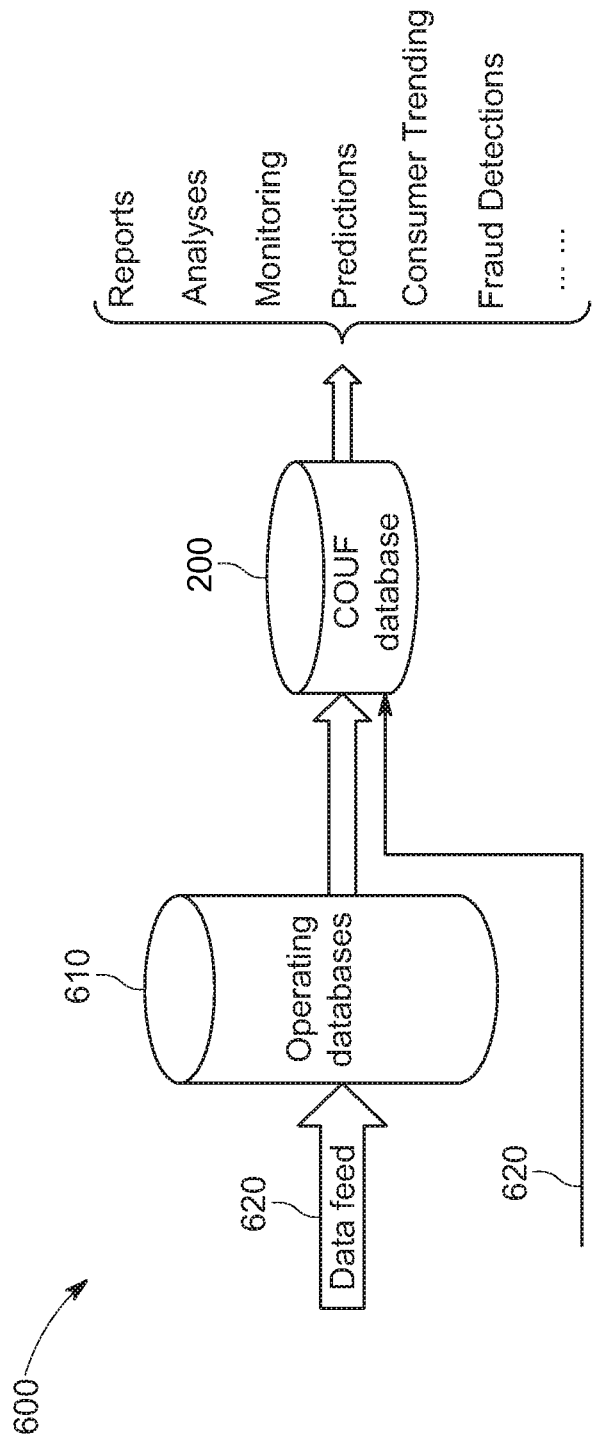
FIG. 6 is a view of a data feed from which contents of a database are formed from according to the principles of the present invention.

Turning now to FIG. 6, FIG. 6 illustrates how a continuous data feed 620 may be received and the unit simple statistics derived therefrom stored in database 200. In other words, data feed 620 may include a plurality of different data sets 100. As each dataset is received, database 200 is updated accordingly. The datasets 100 within feed 620 may go into operating database 610 or are processed into unit simple statistics that are stored in database COUF 200. FIG. 6 illustrates that some companies may already have a database 610. When these companies adopt COUF, they have the option of either putting the unit simple statistics inside operating database 610 as separated tables or set up a separate database 200 to host the unit simple statistics. In any event, when a query for a new statistic comes in so that a report, analysis, prediction or the like can be generated, the unit simple statistics from either 610 or 200 can be accessed instead of having to turn to the raw data itself or the operating database tables.

COUF is a new process for big-data analyses. COUF combines statistics, optimization and database technology together so that it avoids both read and computation redundancies and achieves more efficient and more effective results. This has never been done before and this is done for the first time.

The mathematical formulas used by COUF are well-known, but the way how COUF uses them are not obvious. The way COUF calculates and stores those simple statistics allows new simple statistics to be obtained without reading record details and computations from scratch. The result is that both read and computation redundancies are avoided. Hence it is much faster than other big-data methods.

The following is a discussion of how certain numerical statistics can be easily derived from other statistics. For example, of the statistics (1) number of records, (2) average or mean of the records, (3) minimum of the records, (4) maximum of the records, (5) sum of the records, (6) sum of the records squared, (7) other summations of a numerical field of the records, (8) variance of the records, (9) standard deviation of the records, (10) sample variance of the records, and (11) sample standard deviation of the records, it is now shown that each and all of these quantities need not be derived from the records themselves, but can be derived from others of the statistical quantities. This is significant because (1) to show that it is not necessary to include all of 1-11 above in unit simple statistics, (2) query statistics can easily be derived from unit simple statistics without having to reread individual records and (3) even when units are combined into larger units, statistics may be derived from previously calculated statistics as opposed to rereading the data records.

Let the number of said data records, the sum of said numerical field values of the records, the variance of the records and the average of the records be n, $$\sum_{i=1}^{n} x_i \ \& \ \sigma^2$$

and $\mu$ respectively, where $x_i$ is the $i^{th}$ record, we have $$\mu = \frac{1}{n}\sum_{i=1}^{n} x_i$$

$$\sigma^2 = \frac{1}{n}\sum_{i=1}^{n}(x_i - \mu)^2$$
$$= \frac{1}{n}\sum_{i=1}^{n}(x_i^2 - 2\mu x_i + \mu^2)$$
$$= \frac{1}{n}\sum_{i=1}^{n} x_i^2 - 2\mu\frac{1}{n}\sum_{i=1}^{n} x_i + \mu^2$$
$$= \frac{1}{n}\sum_{i=1}^{n} x_i^2 - \mu^2$$

Then, $$\sum_{i=1}^{n} x_i^2 = n(\sigma^2 + \mu^2) = n\left(\sigma^2 + \left(\frac{1}{n}\sum_{i=1}^{n} x_i\right)^2\right) = n\sigma^2 + \frac{1}{n}\left(\sum_{i=1}^{n} x_i\right)^2 \quad (1)$$

Therefore, if the sum of the square of the numerical fields of some data records needs to be determined (either to determine additional unit simple statistics or to determine a query statistic), this may be achieved from previously calculated statistics as opposed to having to reread all of the data records again and determine this quantity from scratch.

Similarly, other quantities can be calculated from other statistics as opposed to from scratch. For example, the sample variance can be determined from the above quantities without the need of calculating it from scratch. The sample variance $S^2$ can be calculated from the following relationship:

$$\sigma^2 = \frac{n-1}{n}S^2 \quad (2)$$

Likewise, a standard deviation can be calculated from the variance as follows:

$$\sigma = \sqrt{\sigma^2} \quad (3)$$

Also, sample standard deviation can be determined as follows:

$$S = \sqrt{S^2} \quad (4)$$

Therefore, these equations show that it may be possible to determine a new statistic from previously calculated statistics as opposed to calculating the statistic from scratch by rereading all of the data records. Also, in the event that units are combined into a larger unit, it may be possible to calculate statistical quantities of the newly combined unit from the previously calculated statistics of the constituent units, thereby avoiding the need to calculate all of the statistics on the newly created unit from scratch by rereading all of the data records.

Regarding (7) above regarding other summations of a numerical field of data records for a unit simple statistic, there are many possibilities. For example, one can be a summation of a numerical field $x_i$ multiplied by a then adding b and raised to the resultant power of k, and represented as $\Sigma_i(ax_i+b)^k$, with a being any non-zero constant number, b being any constant number, k being any constant number equal to or greater than one and $x_i$ being the $i^{th}$ value of said numerical field. It is kindly noted that if a=1, and b=0 and k=1, this is merely the sum of the numerical fields (5) of data records within a unit. Also, if a=1, and b=0 and 2, this is merely the sum of the numerical fields squared (6). If b≠0, the variance will not change, but the mean will shift by value of b. If a≠1, the new mean is the a times of the original mean and the variance is the $a^2$ times of the original variance. This should be known to those of ordinary skill in the art of statistics.

Again regarding (7) above, another summation that could be used as a unit simple statistic for a unit having data records having a numerical field would be $\Sigma_i|ax_i+b|^k$ noting the absolute value sign. That is, when $ax_i+b>0$, there is no difference, but when $ax_i+b<0$, it flips to the positive side. Hence it measures a different kind of mean, variance, etc. Sometimes this kind of analyses is needed.

Another possible statistic is $\Sigma_i(a|x_i|+b)^k$ where the absolute values of $x_i$ are used. This kind of analyses are needed sometimes.

Also note that with numerical fields, we have a quantity of data records n, the mean or average of the numerical records being $\mu$ can be found from other calculated statistics by realizing the following:

$$\mu = \frac{1}{n}\sum_{i=1}^{n} x_i \Rightarrow \sum_{i=1}^{n} x_i = n\mu \qquad (5)$$

Also suppose that we have the number of records n, the mean of numerical field μ and the sum of numerical values squared as $$\sum_{i=1}^{n} x_i^2,$$

we can determine the sum of the records $$\sum_{i=1}^{n} x_i$$

from the mean and number of records without having to calculate the sum from scratch.

Likewise, if the number or records, the mean of said numerical field values and the variance of said numerical field values are known, we can determine any of $$\sum_{i=1}^{n} x_i \text{ and } \sum_{i=1}^{n} x_i^2$$

using Equations (5) and (1) above without having to calculate these quantities from scratch.

Similarly, if the number of said data records, the mean of said numerical field values and the sample variance of said numerical field values n, μ and $S^2$ respectively are known, Equations (5), (2) and (1) above can be used to derive quantities, $$\sum_{i=1}^{n} x_i \text{ and } \sum_{i=1}^{n} x_i^2$$

without having to calculate them from scratch.

Likewise, if the number of said data records, the mean of said numerical field values and the standard deviation of said numerical field values n, μ and σ are known, the sum of the squares of the records $$\sum_{i=1}^{n} x_i^2$$

can be derived using the above equations without the need to reread the fields of the data records and make this calculation from scratch.

Also, if the number of said data records, the mean of said numerical field values and the sample standard deviation of said numerical field values n, μ and S respectively have already been determined, one can use Equations (5), (4), (2) and (1) above to calculate any of $$\sum_{i=1}^{n} x_i \text{ and } \sum_{i=1}^{n} x_i^2$$

without having to reread the data records and make this calculation from scratch.

As described in the detailed description, units are constructed to host unit simple statistics, each unit corresponding to one or a plurality of records. In the real world, a unit may represent hundreds, thousands, or even millions of records. Then these units are constructed and unit simple statistics are calculated and stored, we use just one record for each unit to represent hundreds, thousands, or even millions of records in the corresponding unit. This is similar to use one page of paper to represent a big book, the result is much easier to find information from one page of paper than from a big book.

Both the database and database table are computer files, and the computer files occupy space in the computer memory. If the computer data file is large, the memory space hosting the computer data file is likewise large. When the database table computer file is large, it becomes difficult for a computer processor to retrieve information from it. Accordingly, if the table can be arranged to reduce the computer file size, it will help to speed up the computer retrieval process dramatically. This is what COUF does. It not only avoids both read and computational redundancies, it reduces the size of computer files in computer memory.

Accordingly, there are three advantages for COUF over Hadoop, Sharp and other big-data analysis methods:
1. Avoiding read redundancy
2. Avoiding computation redundancy
3. Reducing the size of computer files in computer memory to process data analyses All will speed up the data retrieval, and there is a significant advantage to have smaller data files. When the data is so large, sometimes the computer system may not have enough space to host it, and of course it becomes impossible to do any analyses. With COUF, the computer file sizes are reduced dramatically, this makes data analyses possible in many cases where otherwise it would not be possible. In some cases, operating database tables are so busy, the queries on these tables for analyses may disrupt computer operations. This is a critical problem. If COUF is adopted, even if the tables hosting unit simple statistics sit inside of operating database, analysis queries only need to access these tables with unit simple statistics. Accessing to operating database tables is not needed, hence computer operations will not be affected or interrupted.

The population of USA is about 328.2 million in 2019 and there are 435 House Representatives. That is about one House Representative representing 754,000 people. If we assume that one third of population have the right to vote, one House Representative represents 251,000 voters approximately. Obviously, counting the House of Representatives is much easier than to count the voters in the United States. It is hard to image how to pass so many legislations if they all need national votes instead of the Congress.

CliffsNotes, SparkNotes and others are popular for students to help their studies in literature, math, science and more by dramatically reducing readings. CliffsNotes, SparkNotes and creation of the Congress are some of examples in our daily lives to achieve our goals quickly by reducing read and work loads. Many such examples exist in our daily lives, and that is why optimization was induced in science and technology. There is no reason that data analyses, especially big-data analyses cannot utilize this technique and COUF is doing just that.

In data analyses, the object sizes are very important. We also would like to reduce our work load if we can, because it is much easier to analyze a small data set than a big data set. COUF is doing analyses in a similar way to creating US House of Representatives or CliffsNotes or SparkNotes. But unlike Congressional districts, the units in COUF are not evenly divided, some units may represent thousands, or even millions of original raw records, others may only represent a few original raw records. Just like counting the house of representatives is much easier, doing analyses on the unit simple statistics created by COUF is much easier. In some cases, it is beyond easy, it makes big-data analyses possible. With COUF, some big-data analyses could be done on personal computers or small computer servers, which is not possible without using COUF.

Of course, in data analyses, especially in big-data analyses, the units cannot be divided evenly like house representative districts. A unit in COUF represents some concrete quantity to satisfy some need. For different needs, the meaning would be different, hence the units would be defined differently.

The computer data files for data analyses are rearranged by COUF and have the computer file sizes reduced dramatically. This results in more people and companies being able to do big-data analyses easily and can do these analyses more efficiently and more effectively. One of reasons is that the data file sizes could be reduced by thousands or millions times.

In 2017 Equifax reported to have one of the worst data breaches in US with more than 145.5 million customers' information stolen. With COUF, research and analyses are done on unit simple statistics, and no personal identical information is involved. This will reduce the risk of data breaches. Nowdays data hacks are big problems in US, companies, organizations, government agencies and even individual consumers spend billions of dollars every year to protect PIIS, some of these costs could be saved if COUF is adopted.

EXAMPLES

Example 1. Suppose Z is a multinational company. Z has a computer server hosting a database with company's payroll information. Z has several divisions such as marketing, operations, IT, etc. Z uses COUF for its payroll analyses. Suppose Z defines its divisions as the units defined in COUF. Also suppose $x_i$ is the salary value for employee i. Z pre-calculates salary simple statistics for each division (unit) and stores them into company's database as follows:

Number of records: $N_m$, $N_o$, $N_t$ (for Marketing m, Operations o & IT t respectively)

Minimum value of salaries in each division (unit): $\min_m$, $\min_o$, $\min_t$ (for Marketing m, Operations o & IT t respectively)

Maximum value of salaries in each division (unit): $\max_m$, $\max_o$, $\max_t$ (for Marketing m, Operations o & IT t respectively)

Sum of salaries (said numerical field):

$$\sum_m x_i, \sum_o x_i, \sum_t x_i$$

(for Marketing m, Operations o & IT t respectively)
Sum of the squares of the salaries $$\sum_m x_i^2, \sum_o x_i^2, \sum_t x_i^2$$

(for Marketing m, Operations o & IT t respectively)

Later, when they need to find salary simple statistics for the combination of the marketing, operations and IT divisions combined, it is simple. A new larger unit is formed for the combination of the marketing, IT and operations division, and the statistics for the combined and larger unit is calculated from the previously calculated unit simple statistics of the individual divisions without having to calculate the statistics for the new combined group from scratch by rereading all of the constituent data records. As a result, it is no longer necessary to go through all the salary records in those 3 divisions (units). Instead, they can simply get them as follows (with c for combined divisions)

Minimum value of salaries: $\min_c = \min(\min_m, \min_o, \min_t)$
Maximum value of salaries: $\max_c = \max(\max_m, \max_o, \max_t)$
Number of records: $N_c = N_m + N_o + N_t$
Sum of salaries:

$$\sum_c x_i = \sum_m x_i + \sum_o x_i + \sum_t x_i$$

Sum of salaries squared:

$$\sum_c x_i^2 = \sum_m x_i^2 + \sum_o x_i^2 + \sum_t x_i^2$$

With $N_c$, $\min_c$, $\max_c$, $$\sum_c x_i \text{ and } \sum_c x_i^2,$$

we have the total number of employees, the minimum and maximum salaries in those three divisions and it is easy to calculate the salary range, salary average (mean), salary variance and salary standard deviation for a combination of the 3 divisions. We can also use those values to do other analyses, such as statistical tests, predictive analyses, etc. This combination can be arbitrary, and new simple statistics can be obtained in the same way. In big-data analyses, each unit may comprise thousands or millions of data records, and as a result this inventive method and apparatus can greatly reduce processing time and processing resources by eliminating read and computing redundancies. Moreover, COUF does not require extra hardware, and it is cheaper than other big-data analysis methods.

Example 2. A is a social media company, consumers post thousands of messages every day on its website or on its blog. Now A wants to do some analyses on its political board (one of its boards or subjects) which has thousands of messages a day. Fortunately, A adopts COUF, and units are defined by the board (subject) and by the day. Since the data is textual in nature, <Key, Value> arrays are pre-determined as the unit simple statistics and are stored in a database for each day and for each board (subject).

Subsequent to this formation of the data base where the original data is grouped into units and unit simple statistics on each unit are pre-calculated and stored in the database, a query comes in asking for weekly reports requesting statistics for an entire week. Instead of rereading the raw data records and messages to determine this quantity, unit simple statistics for each unit that represents the days of that week are merely combined to get the statistics required for the query. Similarly, for monthly reports, they only need to add those values (counts) for the same Key in the month to get a new <Key, Value> array representing the entire monthly. In other words, data from the <Key, Value> arrays for the constituent days of the queried week or month are combined to produce the statistics for the entire week or month, as opposed to rereading the posted messages and determining weekly and monthly statistics from scratch.

Alternatively, if A wants to find statistics for multiple boards (subjects) together for a weekly or monthly period, it can be done in the same way by merely combining the unit simple statistics as opposed to from scratch by rereading all the posted messages.

As demonstrated in the above examples, COUF avoids both read and computing redundancies, thereby improving processor time and consuming less processor resources. This is the main advantages for COUF over other big-data analysis methods and this has never been done before.

Though the inventive concept has been described with reference to exemplary embodiments illustrated in the drawings, these are provided for an exemplary purpose only, and one of ordinary skill in the art will understand that various modifications and other equivalent embodiments may be made therein. Therefore, the spirit and scope of the inventive concept should be defined by the following claims.

What is claimed is:

1. A calculate once use forever (COUF) data analysis method, comprising:
   providing a central controller and a data feed file, the central controller including at least one processor and a memory operatively connected to the at least one processor, the data feed file including at least one dataset, each of the datasets includes one or a plurality of data records comprising numerical or text data fields and each of the data records including at least one field;
   constructing a computer file comprising a database table to host unit simple statistics upon receipt of the data feed file;
   receiving the data feed file;
   forming one or a plurality of units from the datasets of the data feed file, each of the units corresponds to one or a plurality of the data records;
   calculating the unit simple statistics for each of the units, wherein when the data records corresponding to one of the units comprise a numerical field, the unit simple statistics for this said numerical field include a number of records, a minimum of values of the numerical field of the data records in said unit, a maximum of values of the numerical field of the data records in said unit, a sum of values of the numerical field of the data records in said unit, a sum of values of the numerical field squared of the data records in said unit; and when the data records corresponding to one of the units comprise a text field, the unit simple statistics of said unit for said text field comprise a number of the data records that correspond to said unit and an array of <Key, Value> ordered pairs, wherein the Key of each ordered pair corresponds to textual key words in said text field of the data records corresponding to the unit and Value being associated with said Key being selected from a count of said Key corresponding to said unit and a frequency of said Key corresponding to said unit;
   storing the units comprised of the unit simple statistics within the computer file comprising a database table wherein the computer file comprising a database table occupies less space in computer memory than the data feed file;
   receiving a query requesting an additional statistic to be calculated; and
   calculating the additional statistic using the unit simple statistics stored within the computer file comprising a database table, wherein the calculating the additional statistic from the unit simple statistics reduces processing time and processing resources of the central controller by reducing read redundancies of rereading the data records and reduces computational redundancies of calculating the additional statistic from scratch.

2. The method of claim 1, wherein when the data records corresponding to one of the units comprise a numerical field, the unit simple statistics of said unit for said numerical field comprises:
   a number of said data records in said unit or a number of values of the numerical field of the data records of said unit;
   a sum of values of the numerical field of the data records of said unit; and
   a sum of the square of the values of the numerical field of the data records of said unit.

3. The method of claim 1, wherein when the data records corresponding to one of the units comprise a numerical field, the unit simple statistics of said unit for said numerical field comprises:
   a number of said data records in said unit or a number of values of the numerical field of the data records of said unit;
   a sum of values of the numerical field of the data records of said unit; and
   a variance of the values of the numerical field of the data records of said unit.

4. The method of claim 1, wherein when the data records corresponding to one of the units comprise a numerical field, the unit simple statistics of said unit for said numerical field comprises:
   a number of said data records in said unit or a number of values of the numerical field of the data records of said unit;
   a sum of values of the numerical field of the data records of said unit; and
   a sample variance of the values of the numerical field of the data records of said unit.

5. The method of claim 1, wherein when the data records corresponding to one of the units comprise a numerical field, the unit simple statistics of said unit for said numerical field comprises:
   a number of said data records in said unit or a number of values of the numerical field of the data records of said unit;

a sum of values of the numerical field of the data records of said unit; and a standard deviation of the values of the numerical field of the data records of said unit.

6. The method of claim 1, wherein when the data records corresponding to one of the units comprise a numerical field, the unit simple statistics of said unit for said numerical field comprises:
   a number of said data records in said unit or a number of values of the numerical field of the data records of said unit;
   a sum of values of the numerical field of the data records of said unit; and
   a sample standard deviation of the values of the numerical field of the data records of said unit.

7. The method of claim 1, wherein when the data records corresponding to one of the units comprise a numerical field, the unit simple statistics of said unit for said numerical field comprises:
   a number of said data records in said unit or a number of values of the numerical field of the data records of said unit; and
   a quantity $$\sum_i (ax_i + b)^k$$

where a is any non-zero constant number, b being any constant number, k being any constant number equal to or greater than one and $x_i$ being the $i^{th}$ value of said numerical field in wherein said unit.

8. The method of claim 1, wherein when the data records corresponding to one of the units comprise a numerical field, the unit simple statistics of said unit for said numerical field comprises:
   a number of said data records in said unit or a number of values of the numerical field of the data records of said unit; and
   a quantity $$\sum_i |ax_i + b|^k$$

where a is any non-zero constant number, b being any constant number, k being any constant number equal to or greater than one and $x_i$ being the $i^{th}$ value of said numerical field in wherein said unit.

9. The method of claim 1, wherein when the data records corresponding to one of the units comprise a numerical field, the unit simple statistics of said unit for said numerical field comprises:
   a number of said data records in said unit or a number of values of the numerical field of the data records of said unit; and
   a quantity $$\sum_i (a|x_i| + b)^k$$

where a is any non-zero constant number, b being any constant number, k being any constant number equal to or greater than one and $x_i$ being the $i^{th}$ value of said numerical field in wherein said unit.

10. The method of claim 1, wherein when the data records corresponding to one of the units comprise a numerical field, the unit simple statistics of said unit for said numerical field comprises:
    a number of said data records in said unit or a number of values of the numerical field of the data records of said unit; and
    a mean of the numerical field of the data records of said unit.

11. The method of claim 1, wherein when the data records corresponding to one of the units comprise a numerical field, the unit simple statistics of said unit for said numerical field comprises:
    a number of said data records in said unit or a number of values of the numerical field of the data records of said unit;
    a mean of values of the numerical field of the data records of said unit; and
    a sum of the square of the values of the numerical field of the data records of said unit.

12. The method of claim 1, wherein when the data records corresponding to one of the units comprise a numerical field, the unit simple statistics of said unit for said numerical field comprises:
    a number of said data records in said unit or a number of values of the numerical field of the data records of said unit;
    a mean of values of the numerical field of the data records of said unit; and
    a variance of the values of the numerical field of the data records of said unit.

13. The method of claim 1, wherein when the data records corresponding to one of the units comprise a numerical field, the unit simple statistics of said unit for said numerical field comprises:
    a number of said data records in said unit or a number of values of the numerical field of the data records of said unit;
    a mean of values of the numerical field of the data records of said unit; and
    a sample variance of the values of the numerical field of the data records of said unit.

14. The method of claim 1, wherein when the data records corresponding to one of the units comprise a numerical field, the unit simple statistics of said unit for said numerical field comprises:
    a number of said data records in said unit or a number of values of the numerical field of the data records of said unit;
    a mean of values of the numerical field of the data records of said unit; and
    a standard deviation of the values of the numerical field of the data records of said unit.

15. The method of claim 1, wherein when the data records corresponding to one of the units comprise a numerical field, the unit simple statistics of said unit for said numerical field comprises:
    a number of said data records in said unit or a number of values of the numerical field of the data records of said unit;
    a mean of values of the numerical field of the data records of said unit; and
    a sample standard deviation of the values of the numerical field of the data records of said unit.

16. A non-transitory computer program product comprising a non-transitory computer readable storage medium having program instructions embodied therewith to process a data feed file having one or a plurality of datasets, each of the datasets having one or a plurality of data records comprising numerical or text data fields, each of the data records including at least one field, the program instructions executable by a processor to cause the processor to:

construct a database table to host unit simple statistics upon receipt of the data feed file;

receive the data feed file;

form one or a plurality of units from the datasets of the data feed, each of the units corresponds to at least one of the data records;

calculate the unit simple statistics for each of the units, wherein when the data records corresponding to one of the units comprise a numerical field, the unit simple statistic for said numerical field include a number of values of the numerical field of the data records of said unit, a minimum of values of the numerical field of the data records of said unit, a maximum of values of the numerical field of the data records of said unit, a sum of values of the numerical field of the data records of said unit, a sum of the square of values of the numerical field of the data records of said unit; and when the data records corresponding to one of the units comprise a text field, the unit simple statistics of said unit for said text field comprise a number of the data records that correspond to said unit and an array of <Key, Value> ordered pairs, wherein the Key of each ordered pair corresponds to textual key words in the text field of the data records corresponding to the unit and Value being associated with said Key being the count of said Key corresponding to said unit or the frequency of said Key corresponding to said unit;

store the units comprised of the unit simple statistics within the database table wherein the database table occupies less space in computer memory than the data feed file;

receive a query requesting an additional statistic to be calculated; and calculate the additional statistic using the unit simple statistics stored within the database, wherein the calculating the additional statistic from the unit simple statistics reduces processing time and processing resources of the central controller by reducing read redundancies of rereading the data records and reduces computational redundancies of calculating the additional statistic from scratch.

17. The method of claim 1, wherein when the data records corresponding to one of the units comprise a numerical field, the unit simple statistics of said unit for said numerical field comprises:

a number of said data records in said unit or a number of values of the numerical field of the data records of said unit; and a sum of values of the numerical field of the data records of said unit.

* * * * *